United States Patent [19]

Bharara et al.

[11] Patent Number: 4,739,154
[45] Date of Patent: Apr. 19, 1988

[54] CONVEYOR OVEN DESIGN AND METHOD FOR USING SAME

[75] Inventors: Manmohan S. Bharara, Stamford, Conn.; Ira Nevin, New Rochelle, N.Y.

[73] Assignee: Baker's Pride Oven Co., Inc., New Rochelle, N.Y.

[21] Appl. No.: 903,718

[22] Filed: Sep. 5, 1986

[51] Int. Cl.$^4$ .............................................. F27B 9/06
[52] U.S. Cl. .................................. 219/388; 219/400; 99/386; 99/443 C; 432/8; 432/209
[58] Field of Search ....................... 219/279, 388, 400; 99/386, 443 R, 443 C; 432/135, 136, 143, 144, 145, 147, 148, 209, 8, 59

[56] References Cited

U.S. PATENT DOCUMENTS

| | | | |
|---|---|---|---|
| 3,515,854 | 6/1970 | Williams | 219/388 |
| 3,693,452 | 9/1972 | McGinley et al. | 99/386 |
| 3,823,660 | 7/1974 | Nerthling | 99/386 |
| 4,023,007 | 5/1977 | Brown | 219/388 |
| 4,377,109 | 3/1983 | Brown | 219/400 |
| 4,389,562 | 6/1983 | Chaudoir | 219/388 |
| 4,471,000 | 9/1984 | Brown et al. | 219/388 |
| 4,486,172 | 12/1984 | Dunning | 219/388 |
| 4,591,333 | 5/1986 | Heuke | 99/386 |

Primary Examiner—A. D. Pellinen
Assistant Examiner—Jeffrey A. Gaffin
Attorney, Agent, or Firm—Waldron & Associates

[57] ABSTRACT

A conveyor oven for cooking or heating food products and other items which utilizes a (preferably non-metallic) heat sink to absorb energy from an infrared heat source and then re-radiate the heat into the oven. Control over the degree and distribution of heat is exerted by bottom side vent holes and bottom sliding plates which control the size of the vent hole openings and top rotary flaps which deflect heat onto the food products. A method of cooking or heating food products and other items utilizing such a conveyor oven is also provided.

12 Claims, 3 Drawing Sheets

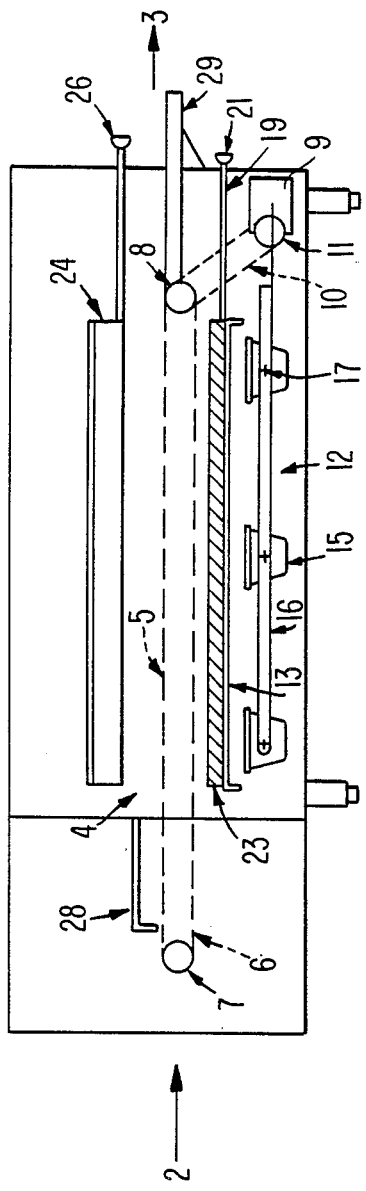

CONVEYOR OVEN DESIGN AND METHOD FOR USING SAME

BACKGROUND OF THE INVENTION

This invention relates to a cooking or heating apparatus, and, more particularly, to an improved oven and method for heating food or other products while they are being conveyed through the oven within a preselected time.

In recent years, tunnel ovens have been developed for use in the fast food and industrial cooking field, such as disclosed in Wells U.S. Pat. No. 4,008,996 and Wells U.S. patent application Ser. No. 956,869. Ovens of this type cook by infrared emission from hearth and roof panels within the tunnel such as disclosed in Wells U.S. Pat. No. 3,809,859, for example.

Infrared ovens of this type are used for cooking steaks, chops, and other meats by conveying them through the oven in a pan. This avoids dropping grease onto the heating elements thereby preventing the combustion of the grease and grease vapors. Further, using infrared emissions avoids the use of heated air for cooking thereby preserving the moisture of food products since heated air tends to dry out food.

A further development in infrared tunnel ovens is seen in Wells et al. U.S. Pat. Nos. 4,366,177 and 4,473,004. These ovens are used to cook meats, chops, and other greasy food products by infrared heating, but in an oxygen-starved atmosphere which substantially precludes the flaming and flaring of grease, or grease vapors and the resultant exposure of the food products to direct flame. The oven and method of cooking eliminates the use of the pan necessitated by the design of the earlier Wells ovens.

A further Wells patent U.S. Pat. No. 4,462,307, allows for cooking food in an oxygen-starved atmosphere by infrared radiation but also allows for controlled flaming of grease from the food.

Another conveyor type cooking apparatus is disclosed in Baker U.S. Pat. No. 3,580,164. This patent discloses a hamburger cooking machine which includes upper and lower cooking elements and a conveyor running between them on which hamburgers are placed for cooking. The hamburgers are cooked using direct infrared energy radiating from the cooking elements. The oven also includes a second conveyor for warming hamburger buns.

SUMMARY OF THE INVENTION

Prior to the present invention, no conveyorized cooking apparatus has appeared which can bake pizza or other food products in a moving conveyor heated by hot ceramic, stone, transite, or any other (preferably) non-metallic heat sink material with controllable distribution of heat over the top and bottom of the food product. In this invention, the non-metallic heat sink material is heated by infrared heat, gas, electric, or any other type of heat source, preferably a radiant heat source, and then the heat energy contained in the non-metallic heat sink is utilized to distribute the heat energy by re-radiation, by conversion to convection and conduction, and to effect baking in the conveyorized cooking chamber of the oven. By this combination of means, the food product is more evenly baked, since the heat sink serves to eliminate point sources of heat, distribute the heat evenly and controllably within the oven, and provide a material conversion of the energy to convective and conductive heat transfer. As a consequence, the cooked product is more evenly and uniformly baked during its transit of the oven, and superior product quality and uniformity are achieved. At the same time, the design of the present invention is both simpler and more economical to make, requiring fewer burner elements and a simpler configuration. In addition, the simple construction and configuration provides easier cleaning and maintenance of the unit, both of which are of considerable import in the food service industry.

The specific demands of baking operations are different from those of broiling, and a much more demanding set of heat transfer criteria are involved. It is essential that heat transfer be even and uniform throughout the cooking period, and it is also important that the heating not dry out the food product excessively during the process. In addition, the baking operation requires a more gradual and progressive cooking operation, so that the interior of the product can be cooked adequately without burning the outside.

While direct infrared heat or hot air convection has been used for cooking or baking with limited success in a conveyor oven, it has not been possible to achieve all the foregoing advantages to achieve a deck or hearth type bake in a conveyor oven due to the nature of the heat transfer characteristics produced. This deck or hearth type bake is achieved in the present invention through heat distribution elements provided. With the hearth effect provided by the heat sink conduction, as well as the material generation of convection and residual re-radiation heating achieved, an exceptionally balanced heat transfer for baking results.

The fast food industry has long needed a conveyorized apparatus which will provide automation and quality cooking or baking results. This invention provides automation through a conveyor and quality cooking or baking through the heat distribution means, including a non-metallic heat sink, convection control, and deflection of heat transfer.

OBJECTS OF THE INVENTION

An object of the present invention is to provide a conveyor type oven for deck or hearth baking with improved heating through a combination of radiant and convection heat emitted by a hot non-metallic heat sink.

Another object of this invention is to provide an improved method of cooking food products using a combination of conduction, radiant and convention heat emitted by a hot non-metallic heat sink.

A further object of this invention is to provide an oven in which the distribution and degree of heat can be controlled by using metal or ceramic baffling and providing adjustable flaps for top heat control and bottom side sliding plates with adjustable vent arrangements to control distribution of heat energy to the top and bottom of foods to be cooked by the heat in the cooking chamber.

Still another object of this invention is to provide an oven with a reliable and simple means for controlling the degree of heat required for various food products.

Another object of this invention is to provide an oven which is easily cleanable and capable of meeting stringent sanitary requirements, as well as being of a self-cleaning nature.

A still further object of this invention is to provide an oven which can provide continuous heating of food or other products, and with such products being continuously fed into and delivered from the oven, yet is extremely energy efficient.

Yet another object of this invention is to provide an oven which can be relatively economically and simply manufactured, which is reliable and of an extremely durable, long-lasting configurtion, and which is very well suited for heavy duty, high-volume commercial usage.

Other objects and features of the invention are in part apparent and in part described in the accompanying description and illustrated in the accompanying drawings

BRIEF DESCRIPTION OF THE DRAWINGS

FIG. 1 is a longitudinal cross-sectional view of the oven of the present invention.

FIG. 2 is a transverse cross-sectional view of of the oven of the present invention, as taken along line 2—2 of FIG. 1.

Corresponding reference characters indicate corresponding parts throughout the several views of the drawings.

DESCRIPTION OF THE PREFERRED EMBODIMENTS

Figure 3:
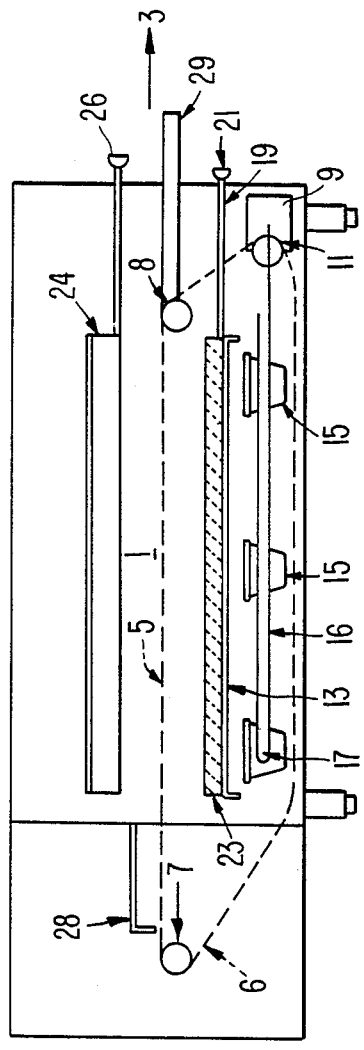
FIG. 3 is a longitudinal cross-sectional view of a second, alternate embodiment of the oven of the present invention.

The present invention differs from the aforementioned Wells patents in that it utilizes combinations of radiation, conduction, natural convection of air and heat energy in an oxygen atmosphere. The oven of the present invention is designed so that the front and rear of the oven are open to draw sufficient air into the oven and to exhaust the products of combustion, if any, out of the oven to maintain a continuous current of air for convection purposes. The present invention also differs from the Wells patents in that there is no upper burner or heat source.

The present invention differs from the aforementioned Baker patent in that it utilizes combinations of radiation, conduction, natural convection of air and heat energy in an oxygen atmosphere. The present invention also differs from the Baker patent in that there is no upper burner or heat source and no bun conveyor.

FIGS. 1 and 2 show a first embodiment of an oven of the present invention. The oven is characterized by a cooking chamber 1 in the form of a tunnel extending between an entrance 2 and an exit 3. Food products are carried through cooking chamber 1 of rectangular cross-section by a conveyor, designated generally at 4, having an endless conveyor including a main horizontal reach 5. It also includes a return reach 6 and rollers 7, 8 at the opposite ends of the oven. The conveyor is driven by conveyor drive 9 and is connected thereto by conveyor drive belt 10 which includes conveyor drive roller 11. Preferably, but not necessarily, return reach 6, as shown, extends within cooking chamber 1 so that it is heated and preferably cleaned by return travel therein.

Figure 4:
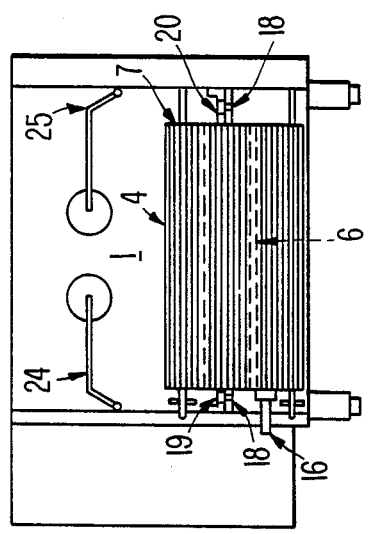
FIG. 4 is a transverse cross-sectional view of the oven of the embodiment of FIG. 3, as taken along line 4—4 thereof.

In the alternative second embodiment of FIGS. 3 and 4, the return is below the burners, and should be employed when it is desirable or necessary to limit the temperature of the conveyor at the loading point, to avoid burning the contact surface of the foodstuff to be baked, i.e., pizza, or the like.

The oven is intended for the baking of pizzas and the baking or like heating and serving of other partially prepared or frozen foods which may be subjected to requisite heating for prompt serving of the same. Hence, the oven is particularly adapted for what is known as fast food service, and especially where there is a demand for servings in relatively high volume in minimum time. The oven has manifest applications for industrial and commercial use. Therefore, it is to be understood that any description hereinbelow of the use of said oven in conjunction with the cooking or other heating of food products or items is merely exemplary and is not to be interpreted as restrictive. Although various food products and other comestibles may be heated within the oven, as for the cooking of the same, other non-food items or articles may well be heated in the oven to advantageous effect.

The outer structure of the oven is made of steel sheet metal and square tubular frame members, preferably stainless. The infrared heat source 12, gas or electric or any other type is located below the bottom metal baffle 13. The controls for the heat source 14 either gas or electric or any other type are shown in FIG. 2. The number and configuration of burners or heating elements 15 will depend on the degree of heat required for a particular application. If the heat source 12 is gas, a gas manifold 16 may be used to connect the gas burners 15. The gas manifold 16 may have valves 17 to allow for the manual adjustment of the burner flame.

The bottom baffle 13 is made of high temperature stainless steel material and has vent holes 18 on either side. There are two slides 19, 20 which control the size of the exposed openings of the vent holes. These slides control the degree of vent hole exposure through a push-pull arrangement. The operator pushes or pulls knobs 21, 22 thereby sliding slides 19, 20 back and forth across the vent holes 18. This mechanism controls the degree of bottom heat available to the oven and assists in controlling the top heat for a proper bake.

The infrared heat energy produced by the burners 15 is absorbed by the metal baffle 13 which then distributes the heat more uniformly over a continuous surface. In order to modulate the uniformity and intensity of the distribution of the re-radiation, preferably a non-metallic heat sink material is used. The non-metallic heat sink 23 is made of ceramic, stone, transite, or any other similar substance and is placed on the metal baffle 13 and secured by mechanical means to achieve direct contact between the metal baffle and the non-metallic heat sink material. The heat from the metal baffle is transferred to the non-metallic heat sink which creates a proper hearth type ambient in the cooking chamber for proper baking. This approach drives the heat into the product without burning the outside and bakes the product evenly by distributing the heat more evenly and avoiding point heat sources within the cooking zone.

Top heat distribution is controlled by two rotary top flaps 24, 25 which run the length of the oven and are located on either side of the oven. The flaps may be continuous or segmented along their length, so that unitary or segmental graduated control may be employed. Independent control of individual segments gives greater control of heat distribution within the oven and can result in superoir performance. The flaps deflect heat energy onto the product being baked. They also act as adjustable heat deflectors and reflectors for the heat rising from the bottom heat source. The flaps are designed with an adjustment mechanism providing the operator with flexibility of adjustment. The operator controls the position of the flaps by turning knobs 26, 27. Using the flaps, the operator can control the amount of heat directed on the food product thereby achieving a desirable bake. The operator is able to vary the height of the "secondary ceiling" in the oven by adjusting the rotary flaps and thereby providing a balanced heat required for baking. The exact design, configuration, slope, and angles of the rotary flaps may vary depending on the application. The ends of the flaps may or may not meet in the center of the oven depending on the application as well.

The conveyor 4 is designed with all the accessories required to allow for the loading and unloading of food product. A preheat chamber 28 made of insulated sheet metal forming an enclosure can be attached to the loading entrance 2 to utilize the heat generated by the oven for pre-baking. A receiving pan 29 can be attached to exit or discharge end 3 for receiving baked food products. In FIG. 1, the return 6 of the conveyor is shown above the heat source 12, which may be desirable to provide a self-cleaning feature when the heating of the conveyor 4 is not detrimental. It is possible, as shown in the alternate embodiment of FIG. 3, to pass the return 6 of the conveyor 4 below the heat source 12, which is ordinarily preferred in order to prevent over-heating of the conveyor 4.

Figure 5A:
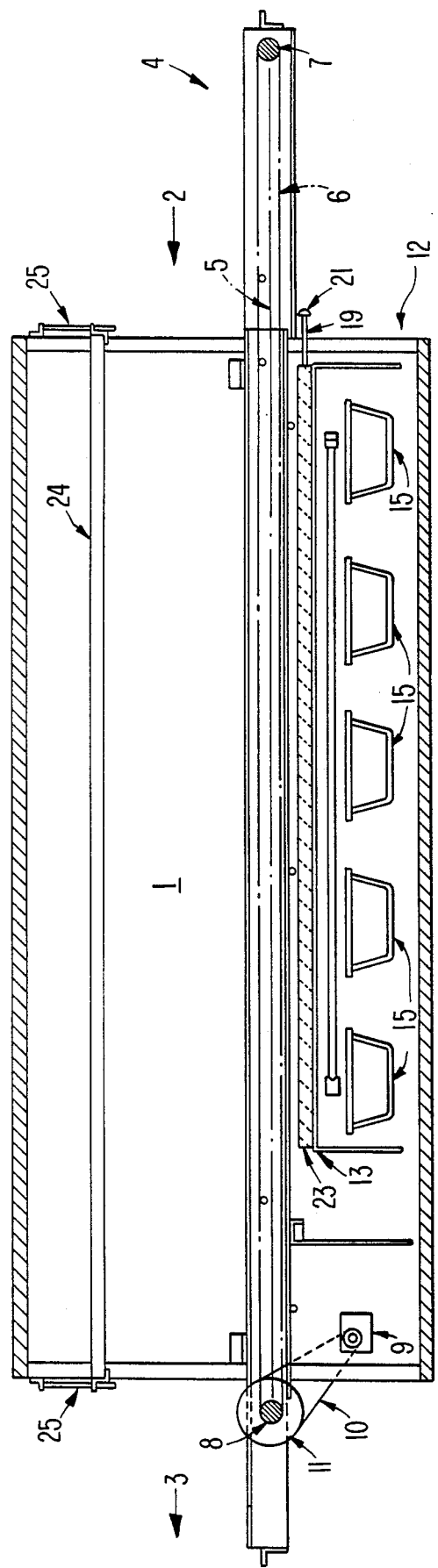
FIG. 5A is a cross-sectional view of another, third alternate embodiment of the oven of the present invention.
Figure 5B:
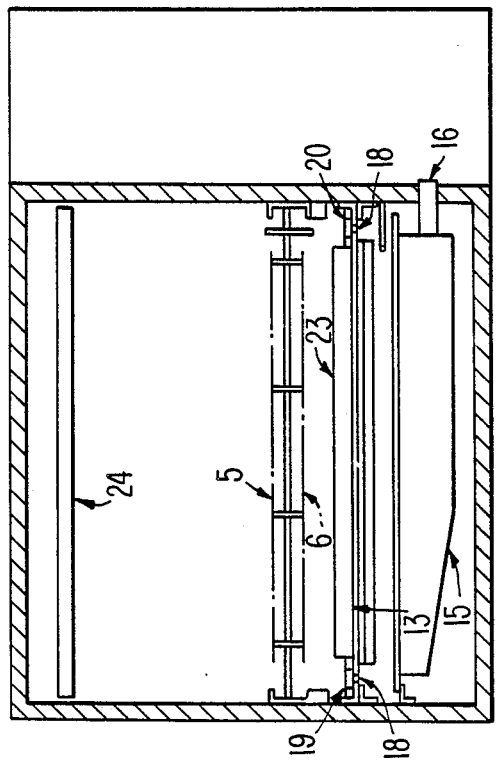
FIG. 5B is a transverse cross-sectional view of the oven of the third embodiment shown in FIG. 5A, as taken along the line 5B—5B thereof.

In an alternate third embodiment, as shown in FIG. 5A, the flaps may be replaced by a flat baffle plate 24 above the conveyor surface 5 which is adjustable in height above the surface of the food being passed through the oven. In this embodiment, as shown in FIG. 3, the baffle plate serves the same function, generally, as do the flaps, although the construction and operation is simpler and the degree of control may be slightly impaired. This embodiment is ordinarily not as flexible, and for that reason alone is not preferred. The baffle plate may be segmented, and each segment can the be individually adjustable to increase the level of control of heat distribution within the oven. While the flat baffle should ordinarily be flat, it can be configured as necessary to fit properly within the oven and to achieve specific heat distribution effects if necessary. For example, the baffle plate could be curved into an arch which could be cylindrical, parabolic, or some other shape, or could be in plural flat sections.

As those of ordinary skill will recognize, the greatest degree of control over the performance of the oven will be gained by combining the flaps and the adjustable height flat baffle plate arrangements, although that combination adds to the complexity and expense of the oven.

Baking in the oven disclosed in this invention occurs due to convected and radiant energy. The heat from the burners is absorbed by the metal baffle and in turn by the non-metallic heat sink and then radiated into the oven from the heat sink. Heat radiating from the burners is also controlled by the bottom sliding plates which control the openings of the side vent holes. This heat and the beat radiating from the non-metallic heat sink is absorbed and reflected by the top rotary flaps. The rotary flaps also control and direct the flow of natural convection. The convection occurs because both ends of the oven are open. The open ends draw sufficient air through the oven, exhaust the products of combustion, and maintain a continuous current of air for natural convection. The design of the oven of this invention allows the use of all possible forms of heat energy and means to transfer such heat energy for baking, including, radiation, re-radiation, natural convection, conduction, stored energy in the heat sink, and reflection and deflection from the adjustable flaps, resulting in a highly energy efficient cooking sytem.

Although the foregoing includes a description of the best mode contemplated for carrying out the invention, various modifications can be made in the constructions and methods herein described and illustrated without departing from the scope of the invention. It is intended that all matter contained in the foregoing description or shown in the accompanying drawings shall be interpreted as illustrative rather than limiting.

What is claimed is:

1. A baking oven comprising:
   A. a cooking chamber;
   B. conveyor means passing through said cooking chamber for conveying food product therethrough for a controllable time for baking thereof using a combination of radiant heat, convected heat and conducted heat;
   C. said cooking chamber having an inlet and an outlet for said conveyor, said food product, and air;
   D. at least one radiant heating means disposed within said cooking chamber and below said conveyor, including means to regulate heat output thereof;
   E. heat distribution means within said cooking chamber, said distribution means comprising a baffle nonintegrally disposed between said radiant heating means and said conveyor means with said food product, said baffle comprising a non-metallic heat sink means for absorbing and re-radiating heat energy and converting radiant energy to convection and conduction heat energy, and, disposed above said conveyor means and said food product, adjustable heat deflector means to control distribution of heat to the top of said food product.

2. The baking oven of claim 1, wherein said baffle comprises a metal channel, having a generally flat upper surface integrally supporting said non-metallic heat sink.

3. The baking oven of claim 1, wherein said non-metallic heat sink is formed of a material selected from the group consisting of ceramic, stone and transite.

4. The baking oven of claim 1, wherein said adjustable heat deflector means to control distribution of heat to the top of said food product comprises elongated flaps extending generally parallel to said conveyor means and pivotally mounted within said cooking chamber above said conveyor means, and further comprising adjustment means extending out of said cooking chamber for altering the alignment of said elongated flaps while the oven is in use.

5. The baking oven of claim 4 wherein said flaps are segmented along the axis of travel of said conveyor, and each of said segments is independently adjustable.

6. The baking oven of claim 1, wherein said adjustable heat deflector means to control distribution of heat to the top of said food product comprises a baffle plate and means to adjust the height of said baffle plate above said food product.

7. The baking oven of claim 6, wherein said baffle plate is flat.

8. An oven including a cooking chamber;

conveyor means therein for conveying food products through said chamber for heating of said products by infrared radiation, conduction, and convection within said chamber;

said chamber characterized by structure providing opening means for ingress and egress of products and air with respect to said chamber;

heating means comprising electric infrared heaters, a bottom metal baffle located above said electric heaters, and a non-metallic heat sink integrally attached to the upper surface of said bottom metal baffle;

and heat controlling means comprising adjustable rotary flaps located in the upper portion of said chamber, above said conveyor means.

9. The baking oven of claim 6, wherein said baffle plate is longitudinally segmented, and each segment is independently adjustable in height above said food product.

10. The oven of claim 8 in which said adjustable rotary flaps control the amount of convected and radiant heat energy being reflected on said food products.

11. The oven of claim 8 in which said non-metallic heat sink is made of material selected from the group consisting of ceramic, stone, or transite.

12. The oven of claim 8 in which said heat controlling means are connected to rods which allow said heat controlling means to be adjusted from outside said oven.

* * * * *